[12] United States Patent
Wang et al.

(10) Patent No.: US 9,966,888 B2
(45) Date of Patent: *May 8, 2018

(54) DAMPING SYSTEM FOR A GENERATOR

(71) Applicant: GE AVIATION SYSTEMS, LLC, Grand Rapids, MI (US)

(72) Inventors: Kaiyu Wang, Dayton, OH (US); Paul Robert Gemin, Cincinnati, OH (US); David Woodburn, Dayton, OH (US)

(73) Assignee: GE Aviation Systems, LLC, Grand Rapids, MI (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/796,226

(22) Filed: Oct. 27, 2017

(65) Prior Publication Data

US 2018/0054146 A1 Feb. 22, 2018

Related U.S. Application Data

(63) Continuation of application No. 15/243,336, filed on Aug. 22, 2016.

(51) Int. Cl.
*H02P 9/10* (2006.01)
*H02P 9/00* (2006.01)

(52) U.S. Cl.
CPC .............. *H02P 9/105* (2013.01); *H02P 9/006* (2013.01)

(58) Field of Classification Search
CPC .................................. H02P 9/105; H02P 9/006
See application file for complete search history.

(56) References Cited

U.S. PATENT DOCUMENTS

| 6,992,466 B2* | 1/2006 | Chadwick | H02M 7/53873 |
| | | | 290/40 C |
| 9,148,022 B2* | 9/2015 | Ali | H02J 3/386 |
| 2007/0121354 A1* | 5/2007 | Jones | H02M 5/4585 |
| | | | 363/47 |
| 2007/0279012 A1 | 12/2007 | Sihler | |
| 2011/0109085 A1* | 5/2011 | Nelson | H02J 3/24 |
| | | | 290/44 |
| 2012/0063179 A1* | 3/2012 | Gong | H02M 1/12 |
| | | | 363/40 |
| 2013/0009610 A1* | 1/2013 | Niiranen | H02P 9/007 |
| | | | 322/19 |
| 2013/0027994 A1* | 1/2013 | Nelson | H02P 9/105 |
| | | | 363/40 |

(Continued)

OTHER PUBLICATIONS

International Search Report and Written Opinion issued in connection with corresponding PCT Application No. PCT/US2017/046303 dated Dec. 12, 2017.

*Primary Examiner* — Viet Nguyen
(74) *Attorney, Agent, or Firm* — GE Aviation Patent Operation

(57) ABSTRACT

A damping system can include a sensor disposed to measure an amplitude of a speed ripple of a drive shaft of a generator, and can include a feedforward circuit connected to the sensor and to the generator. The feedforward circuit can determine a phase angle formed by a load resistance and a load capacitance driven by the generator, calculate a voltage signal value based on the amplitude and the phase angle, and can adjust a DC link voltage provided by the generator and across the load resistance according to the voltage signal value.

20 Claims, 4 Drawing Sheets

(56) References Cited

U.S. PATENT DOCUMENTS

| | | | |
|---|---|---|---|
| 2013/0300116 A1* | 11/2013 | Egedal | F03D 7/026 290/44 |
| 2013/0335041 A1* | 12/2013 | Baek | H02M 7/12 322/89 |
| 2016/0218650 A1* | 7/2016 | Gajanayake | F01D 15/10 |

* cited by examiner

DAMPING SYSTEM FOR A GENERATOR

PRIORITY

This U.S. patent application is a continuation of U.S. patent application Ser. No. 15/243,336 filed Aug. 22, 2016, the disclosure of which is incorporated herein by reference in their entireties.

BACKGROUND OF THE INVENTION

An electrical generator can be driven by a drive shaft having uneven speed or torque which can result in unwanted oscillation or a mechanical shearing of the drive shaft. For example, an aircraft can provide rotation to the drive shaft from a prime mover such as a gas turbine engine. It is known to use a mechanical damper interposed in the drive shaft to reduce torsional oscillation of the drive shaft. But in applications where parameters of weight or volume are important such as in aircraft, a mechanical damper consumes valuable space and adds weight. Moreover a mechanical damper may not dynamically adjust to varying torque conditions. It is also known to provide an electrical damper that absorbs ripple in the mechanical torque by varying the size of the electrical load on the damper. However, the electrical load on the generator may be a constant power load that responds to changes in generator voltage by absorbing no more or less power as the voltage varies. So it is known to use a capacitor to filter a rectified output of the generator that may reactively absorb fluctuations in the electrical load which are out of phase with the ripple in mechanical torque. Yet there remains some power loss in such systems.

SUMMARY OF THE INVENTION

In one aspect, a damping system is disclosed for damping torsional oscillation in a drive shaft of a generator providing a direct current (DC) link voltage across a load resistance shunted by a DC link capacitor smoothing the DC link voltage. The damping system can include a sensor disposed to measure an amplitude of a speed ripple of the drive shaft and a feedforward circuit connected to the sensor and to the generator. The feedforward circuit can have a module configured to determine a phase angle formed by the load resistance and a load capacitance of the DC link capacitor, and can calculate a voltage signal value based on the amplitude and the phase angle, and can adjust the DC link voltage according to the voltage signal value.

In another aspect, there is disclosed a power circuit which can comprise a generator and a rectifier connected between the generator and a constant power load. The generator can provide a DC link voltage across the constant power load and a load resistance. The power circuit can include a DC link capacitor shunting the load resistance for smoothing the DC link voltage, and can further include a sensor disposed to measure an amplitude of a speed ripple in the generator. A feedforward circuit can be connected to the sensor and to the generator, and a module of the feedforward circuit can be configured to determine a phase angle formed by the load resistance and a load capacitance of the DC link capacitor. The feedforward circuit can further include calculating a voltage signal value based on the amplitude and the phase angle and can include adjusting the DC link voltage according to the voltage signal value.

In yet another aspect, there is disclosed a method of damping torsional oscillation in a drive shaft of a generator providing a direct current (DC) link voltage across a load resistance shunted by a DC link capacitor smoothing the DC link voltage. The method can include determining an amplitude of a speed ripple of the drive shaft. The method can further include determining a phase angle formed by the load resistance and a load capacitance of DC link capacitor. The method can further include calculating in a feedforward circuit a voltage signal value based on the amplitude and the phase angle. The method can further include adjusting the DC link voltage according to the voltage signal value.

DETAILED DESCRIPTION

As may be appreciated, based on the disclosure, there exists a need in the art for an electrical damper to absorb ripple in a mechanical torque or speed of a drive shaft of an electrical generator. Further, there exists a need in the art for an electrical damper integrated with a constant power load of the generator. Additionally, there exists a need in the art for an electrical damper that absorbs or reflects unwanted ripple power in the presence of a filtering capacitor at the output of a rectifier of the electrical generator.

Figure 1:
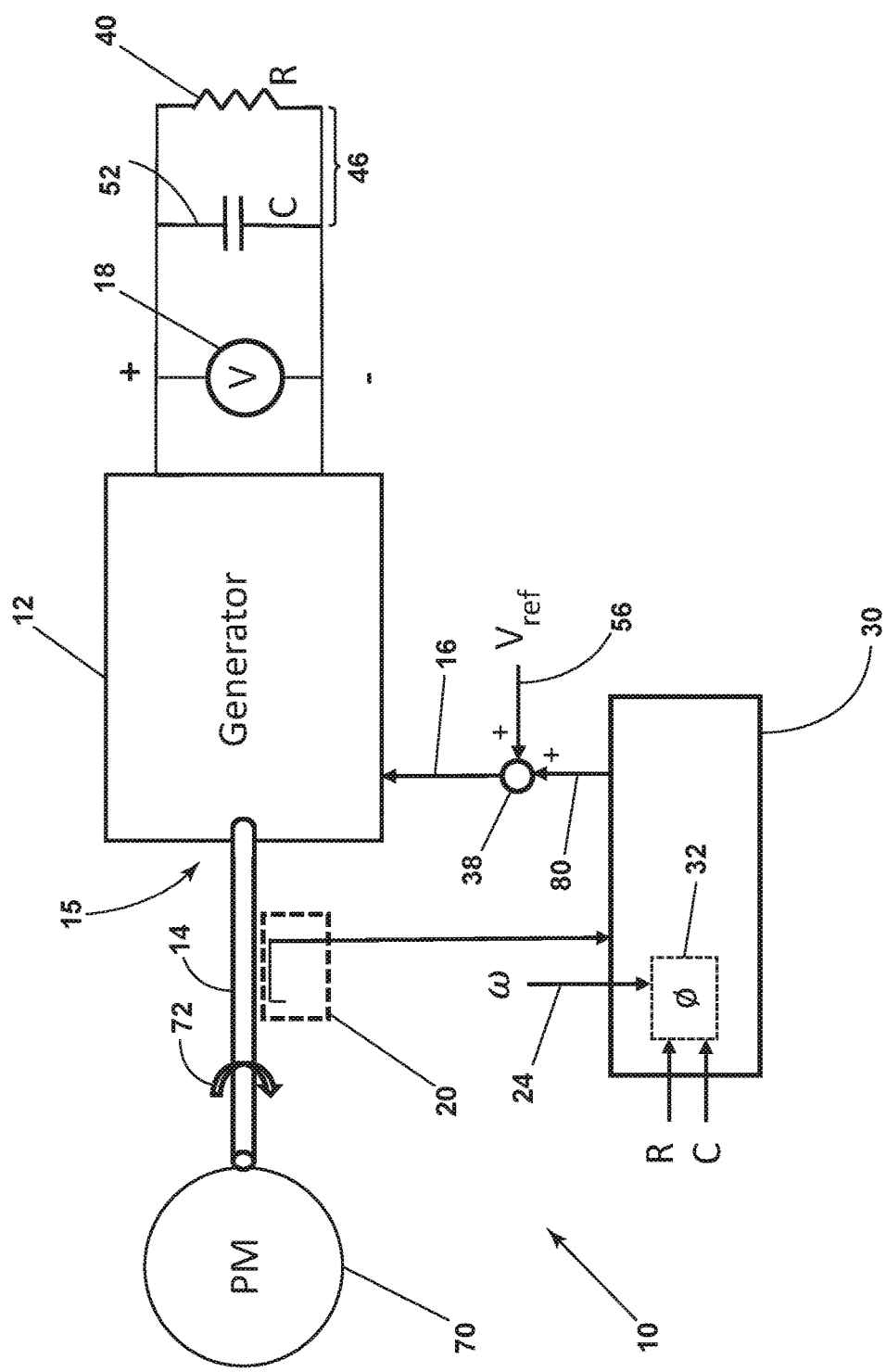
FIG. 1 illustrates a damping system for a generator providing a DC link voltage, in accordance with various aspects described herein.

Referring to FIG. 1, in one aspect of the present disclosure, a damping system 10 can be combined with a generator 12 having a drive shaft 14 and providing a direct current (DC) link voltage 18 across a load resistance (R) 40. A DC link capacitor 50 can have a load capacitance (C) 52 smoothing the DC link voltage 18 of the generator 12. For example, DC link voltage 18 can be a rectifier output having alternating current (AC) ripple needing low-pass filtering to provide a steady regulated DC link voltage 18 for load resistance 40. For instance, the electrical load represented by load resistance 40 might tolerate a +/−5%, 10% or 20% variation in DC link voltage 18 and can require DC link capacitor 50 to filter out noise or high-frequency components. Prime mover 70, such as a gas turbine engine, can provide a nominal rate of rotation 72 to the drive shaft 14 with a shaft input 15 to the generator 12. Additionally, the drive shaft 14 will have a torsional oscillation (or speed ripple). Load resistance 40 can reflect a substantially constant mechanical load to shaft input 15 which can, without a damping action, sustain or exacerbate the speed ripple.

Figure 3:
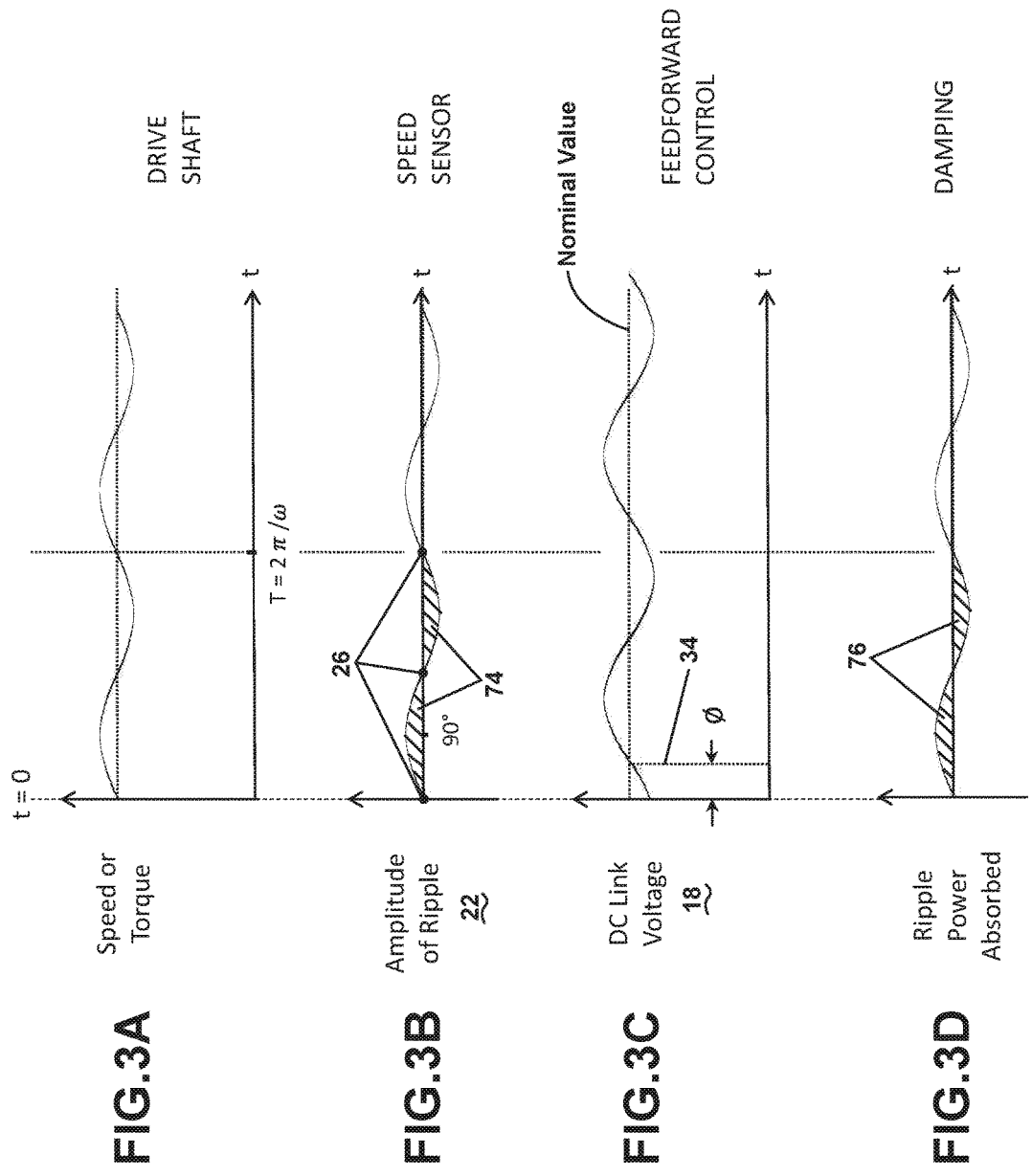
FIG. 3A illustrates a graph of a speed ripple of a drive shaft of the generator in FIGS. 1 and 2, in accordance with various aspects described herein.
FIG. 3B illustrates a graph of an amplitude of the speed ripple of FIG. 3A indicating a variation in a ripple power transmitted by the drive shaft, in accordance with various aspects described herein.
FIG. 3C illustrates a graph of an adjustment of the DC link voltage of FIGS. 1 and 2 being offset in phase from the speed ripple, in accordance with various aspects described herein.
FIG. 3D illustrates a graph of a power damping offered by the damping system of FIG. 3C, in accordance with various aspects described herein.

Turning now also to FIG. 3, the speed ripple can be steadily periodic, such as represented by a sine wave, with a speed ripple amplitude 22 and a speed ripple phase 26, or it can persist for a limited number of cycles at an angular frequency 24 before changing in speed ripple amplitude 22 or speed ripple phase 26, or it can be impulsive or intermittent, depending on the stability of components associated with the prime mover 70, the drive shaft 14, and the generator 12. For example, an undamped generator may present a constant horsepower load to the drive shaft which can cause the speed ripple to react positively or negatively. The generator 12 can be a highly efficient energy converter, and the electrical power delivered by the generator 12 can result in approximately the same mechanical power presented at shaft input 15. For example, over 90% of the mechanical power transmitted to shaft input 15 can appear as electrical power across load resistance 40 and load capacitance 52. Generator efficiency can be lower than 90% as well.

Continuing with FIG. 1, in an aspect, damping system 10 can include a ripple sensor 20 disposed to measure the speed ripple amplitude 22 of the drive shaft 14. The ripple sensor 20 can connect to drive shaft 14 or to generator 12 by mechanical, electrical, or wireless means, and can also provide an indication of the speed, torque, horsepower, frequency, or acceleration of the drive shaft 14. Damping system 10 can further include a feedforward circuit 30 connected to the ripple sensor 20 and to the generator 12. A module 32 of the feedforward circuit 30 can be configured to determine a DC link phase angle 34 formed by the load resistance and the load capacitance 52 of the DC link capacitor 50. The DC link phase angle 34 can define a power-to-voltage relationship for an RC load 46 of the generator 12, the RC load 46 comprising the load resistance 40 in parallel with the load capacitance 52. The module 32 can further be configured to calculate a voltage signal value 80 based on the speed ripple amplitude 22 and the DC link phase angle 34, and to adjust the DC link voltage 18 according to the voltage signal value 80. Beneficially, adjusting the DC link voltage 18 based on the speed ripple amplitude 22 and the DC link phase angle 34 can provide a damping power in the RC load 46 that substantially dampens or eliminates the torsional oscillation in drive shaft 14.

In an aspect of the damping system 10, feedforward circuit 30 can set a magnitude (not shown) of the voltage signal value 80 to be proportional to the speed ripple amplitude 22 of the speed ripple such that the DC link voltage 18 is increased as a speed or a torque of the drive shaft 14 increases, and decreased as a speed or a torque of the drive shaft 14 decreases, thereby accommodating a ripple power of the speed ripple (or torsional oscillation) transmitted to the generator 12. Beneficially, the feedforward circuit 30 can also offset a phase of the adjusted DC link voltage 18 from the speed ripple by the DC link phase angle 34 (FIG. 3C) such that the damping power provided in the RC load 44 is in phase with the ripple power transmitted to the generator 12. Adjustment of the DC link voltage 18 by the feedforward circuit 30 in the presence of a periodic speed ripple can be viewed as a wiggling of the DC link voltage 18 to create the damping power. Some of the damping power is dissipated in the load resistance 40 and some is temporarily stored in the load capacitance 52.

Referring still to FIG. 1, the ripple sensor 20 can also be configured to measure an angular frequency ($\omega$) 24 of the speed ripple from which the module 32 can determine an impedance of the load capacitance 52 ($1/j\omega C$) at the angular frequency 24. The DC link phase angle 34 can describe by how much the damping power leads a phase of the DC link voltage wiggling depending on the size of the load capacitance 52, the load resistance 40, and angular frequency 24. In an aspect of the disclosure, the feedforward circuit 30 can retard the wiggling of the DC link voltage 18 with respect to the speed ripple by the DC link phase angle 34 being zero to ninety degrees so that the ripple power is in phase with the damping power, thereby substantially dampening or eliminating the torsional oscillation (speed ripple). In another aspect, the DC link phase angle ($\Phi$) 34 can be calculated as an arctangent of one-half of a product of the angular frequency 24, the load capacitance 52, and the load resistance 40, or $\Phi=\arctan(\omega RC/2)$.

Applying the arctangent relationship above, when the load capacitance 52 is essentially zero, the DC link phase angle 34 can be approximately 0 degrees because all of a current (not shown) flowing out of generator 12 is in phase with the DC link voltage 18. For example, a load capacitance 52 whose impedance ($1/j\omega C$) is three times the load resistance 40 can be regarded as essentially zero because a phase shift of $\arctan(\omega RC/2)$ is $\arctan(\frac{1}{6})=9$ degrees, or approximately 0 degrees. Alternately, when the load resistance 40 is essentially infinite, the DC link phase angle 34 can be approximately 90 degrees because the current flowing out of generator 12 leads the DC link voltage 18 by ninety degrees or slightly less than 90 degrees. For example, the load resistance 40 being ten times greater than the impedance ($1/j\omega C$) of the load capacitance 52 at angular frequency $\omega$ can be regarded as essentially infinite because a phase shift of $\arctan(\omega RC/2)$ is $\arctan(5)=79$ degrees, or approximately 90 degrees. Beneficially, the DC link capacitance 50 can alone provide torsional damping without the use of a load resistance. The present disclosure is an improvement in damping torsional oscillation by adapting the feedforward circuit 30 to various values of load resistance 40 and load capacitance 52, which components perform other functions such as filtering. Additional advantages will be described below.

Continuing with FIG. 1, in various aspects, a DC link reference ($V_{ref}$) 56 can be provided at an output of the feedforward circuit 30 as a nominal operating set point for the DC link voltage 18 In addition, the DC link reference 56 can be combined in a summing node 38 with the voltage value signal 80 to superimpose the damping function described above. In one aspect, an output of the summing node 38 can connect to a control input 16 of the generator 12 to control the DC link voltage 18. For example, the generator 12 can be a variable speed generator having a variable AC output frequency and an output voltage rectified by an internal rectifier (FIG. 2), where the control input 16 can set the output voltage. In this case, the value of the DC link capacitance 50 can be chosen to perform filtering in accordance with a range of output frequencies. Alternatively, the generator 12 can be a fixed speed generator having a fixed output frequency where there is less constraint on the choice of the DC link capacitance. In other aspects, the voltage value signal 80 can connect directly to the control input 16 without the use of summing node 38 or the DC link reference 56, and the nominal operating point for the generator output voltage may be set elsewhere, such as by a separate control input.

Figure 2:
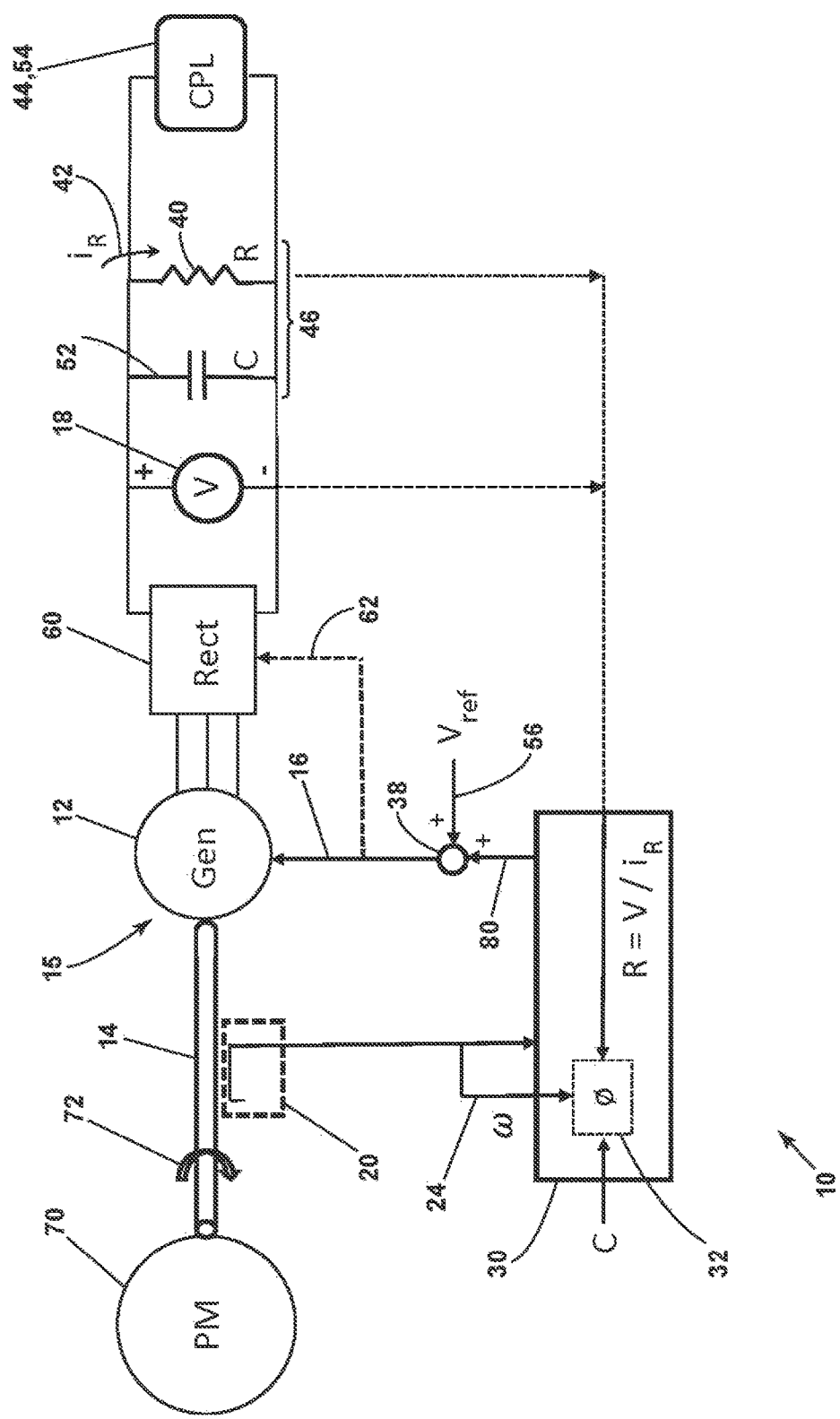
FIG. 2 illustrates a damping system for a generator with a rectifier driving a constant power load, in accordance with various aspects described herein.

Referring now to FIG. 2, in another aspect, a rectifier 60 can be connected between the generator 12 and a constant power load 44 to provide the DC link voltage 18 to the constant power load 44 and the load resistance 40. The rectifier 60 can be a passive rectifier, such as a diode rectifier converting an AC voltage from the generator 12 to the DC link voltage 18. The rectifier 60 can also be an active rectifier where a control input 62 of the rectifier can receive the DC link voltage adjustment from the feedforward circuit 30. The constant power load 44 can accept a range of voltages supplied by DC link voltage 18 without a change in a power consumed by the constant power load 44. Generator systems such as a turbine-driven generator aboard an aircraft can commonly drive constant power loads 44 such as a voltage inverter that produces an AC output or such as a voltage converter that produces a DC output. Advantageously, constant power loads 44 can tolerate deviations from a nominal DC link voltage 18 without malfunctioning, and operate at a high power conversion efficiency. However, adjusting the DC link voltage to generate a damping power can be independent of the size or operation of the constant power load 44. Beneficially, the load resistance 40 is a constant resistance and an effective DC link phase angle 34 can be managed by simply knowing the values of the load resistance 40 and load capacitance 52.

Since the load resistance 40 can change dynamically as various aircraft loads are switched on an off, the resistor current 42 can be measured by the feedforward circuit 30 to calculate an accurate load resistance using a knowledge of the DC link voltage 18. The damping system 10 can then maintain an optimum DC link phase angle 34 while the load resistance 40 and the constant power load 44 draw varying amounts of power. Although the DC link capacitance 50 can be fixed in value, the constant power load 44 can also contain a capacitance which can be included in determining the overall load capacitance 52. The load current 42 can be determined with a current shunt (not shown) in parallel with the load resistance 40, or by receiving one or more data values indicating which load circuits are operating off the DC link voltage and their respective current drains, or by any other means known in the art.

The load resistance 40 can be a resistive load chosen to provide more or less damping for a given variation (wiggle) applied by the feedforward control circuit 30, and can also include pre-existing load circuits (not shown) depending on the generator 12 for power within an operating environment. In one aspect, the load resistance 40 can be intentionally added across DC link voltage 18 to achieve a desired damping of mechanical oscillation in drive shaft 14. Load resistance 40 can be set to be small enough so that the DC link 'wiggle' does not violate a maximum voltage tolerance of the constant power load 44. The load resistance 40 can also be chosen to be large enough to avoid unnecessary power loss while providing a damping of the mechanical oscillation in drive shaft 14. In another aspect, load resistance 40 is determined by the pre-existing load circuits in the operating environment and cannot be randomly adjusted for damping purposes. In yet another aspect, a combination of an intentionally added load resistance and pre-existing load circuits may determine load resistance 40. The load resistance 40 can also be chosen to provide an RC time constant providing an optimized low-pass filter corner frequency for removing unwanted high-frequency signals from rectifier 60.

FIGS. 3A-3D illustrate aspects of the phase relationships that can exist in the damping system 10 described by FIGS. 1 and 2 above. There can be a periodic ripple in the speed or torque of the rotating drive shaft, as shown in FIG. 3A, where a period T can be equal to $2\pi/\omega$ and $\omega$ is the angular frequency of the speed ripple. The ripple can also be non-sinusoidal, such as a tending toward a square wave, or can be impulsive, or have more than one frequency component. Referring to FIG. 3B, the ripple sensor (FIGS. 1 and 2) can detect the amplitude 22 of the speed ripple and thereby have an indication of a ripple power 74 of the torsional oscillation. For instance, the ripple power can be proportional to a square of the amplitude 22 of the speed ripple. A phase of the speed ripple can be determined by the ripple sensor detecting zero-crossings 26 of the amplitude 22. Alternatively, a phase detector or peak detector could be used to determine a relative phase of the speed ripple. In FIG. 3C, the DC link phase angle 34 can be determined by the feedforward circuit 30 to describe by how much a damping power caused by the feedforward circuit 30 will lead a phase of the DC link voltage wiggling, depending on the size of the load capacitance, the load resistance, and the angular frequency.

The feedforward circuit 30 can adjust the DC link voltage 18 about its nominal operating point, proportional to the amplitude 22, and delayed in phased by the DC link phase angle 34 with respect to the speed ripple in FIG. 3A. FIG. 3D illustrates that the damping power 76 can be caused to be in phase with the ripple power 74 such that the ripple power is absorbed substantially or completely by the load resistance and the load capacitance driven by the DC link voltage. Alternately, the DC link voltage 18 can be delayed or advanced in phase by an amount 180 degrees opposite that of the DC link phase angle 34, or by an intermediate amount, in order to test for or accommodate various stability dynamics of the torsional oscillation. For example, it can be desirable to test a response of the drive shaft to a non-cancelling damping power in order to determine stability characteristics of the torsional vibration.

Figure 4:
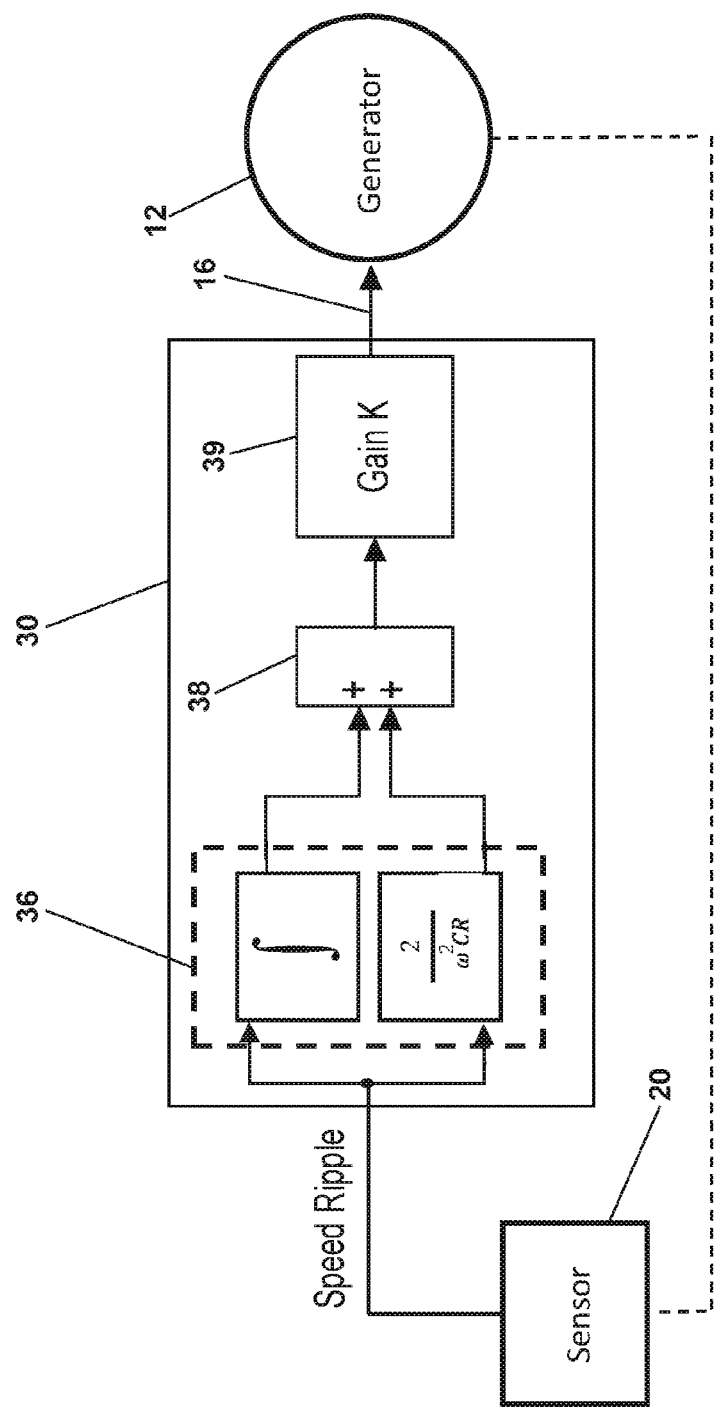
FIG. 4 illustrates a feedforward circuit for adjusting the DC link voltage in the damping system of FIGS. 1 and 2, in accordance with various aspects described herein.

FIG. 4 illustrates one possible aspect of the feedforward circuit 30 where an integrator block 36 can calculate the DC link phase angle 34, a sample of the speed ripple from the ripple sensor 20 can be applied to the integrator block 36, and the results summed in the summing node 38. A gain block 39 can set value K to calibrate the summed results of the summing node 38 to gain and efficiency factors within the feedforward circuit and the generator 12 and to provide a control input 16 which substantially dampens the torsional oscillation of the drive shaft 14, shown in FIGS. 1 and 2. The dotted line illustrates the sensor 20 acquiring a sample of the speed ripple from the generator 12, but the sensor 20 can also acquire a sample of the speed ripple from the drive shaft 14, from a rectifier rectifying an output of the generator 12, or from other components associated with the drive shaft 14 or generator 12.

Many other possible embodiments and configurations in addition to those shown in the above figures are contemplated by the present disclosure. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" or "a plurality of" various elements have been described, it will be understood that "a set" or "a plurality" can include any number of the respective elements, including only one element. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A damping system for damping torsional oscillation in a drive shaft of a generator providing a direct current (DC) link voltage across a load resistance shunted by a DC link capacitor smoothing the DC link voltage, the damping system comprising:
   a measurement device that provides an indication of at least one of: a torque, a horsepower, a frequency, or an acceleration of the drive shaft;
   a feedforward circuit connected to the measurement device and to the generator, the feedforward circuit configured to determine a phase angle formed by the load resistance and a load capacitance of the DC link capacitor, calculate a voltage signal value based on the indication from the measurement device and the determined phase angle, and adjust the DC link voltage according to the voltage signal value.

2. The damping system of claim 1 wherein a speed ripple of the drive shaft is determined based on the indication from the measurement device.

3. The damping system of claim 2 wherein a magnitude of a voltage signal is proportional to an amplitude of the speed ripple.

4. The damping system of claim 3 wherein a phase of the adjusted DC link voltage is offset from the speed ripple by the phase angle.

5. The damping system of claim 2 wherein the measurement device is configured to measure an angular frequency of the speed ripple.

6. The damping system of claim 5 wherein the phase angle is calculated as an arctangent of one-half of a product of the angular frequency, the load capacitance, and the load resistance.

7. The damping system of claim 1 wherein the generator is an alternating current (AC) generator and includes a rectifier providing the DC link voltage, the feedforward circuit adjusting the DC link voltage at a control input of the generator.

8. The damping system of claim 1 wherein the phase angle is approximately 0 degrees when the load capacitance is essentially zero and is approximately 90 degrees when the load resistance is essentially infinite.

9. A power circuit comprising:
   a generator;
   a rectifier connected between the generator and a constant power load to provide a DC link voltage across the constant power load and a load resistance;
   a DC link capacitor shunting the load resistance for smoothing the DC link voltage;
   a measurement device disposed to determine at least one of: a torque, a horsepower, a frequency, or an acceleration of the drive shaft; and
   a feedforward circuit connected to the measurement device and to the generator, the feedforward circuit configured to determine a phase angle formed by the load resistance and a load capacitance of the DC link capacitor, calculate a voltage signal value based on the indication from the measurement device and the determined phase angle, and adjust the DC link voltage according to the voltage signal value.

10. The power circuit of claim 9 wherein a speed ripple of the drive shaft is determined based on the indication from the measurement device.

11. The power circuit of claim 10 wherein a magnitude of the voltage signal value is proportional to an amplitude of the speed ripple and a phase of the DC link voltage adjustment is offset from the speed ripple by the phase angle.

12. The power circuit of claim 11 where the phase of the DC link voltage adjustment is retarded from the speed ripple by the phase angle ranging from zero to ninety degrees.

13. The power circuit of claim 12 wherein the speed ripple is a torsional oscillation in a drive shaft of the generator.

14. The power circuit of claim 10 wherein the measurement device is configured to determine an angular frequency of the speed ripple.

15. The power circuit of claim 9 wherein the rectifier is an active rectifier, the feedforward circuit adjusting the DC link voltage at a control input of the active rectifier.

16. The power circuit of claim 9 further comprising the feedforward circuit determining a load current of the load resistance to calculate the load resistance from the DC link voltage.

17. A method of damping torsional oscillation in a drive shaft of a generator providing a direct current (DC) link voltage across a load resistance shunted by a DC link capacitor smoothing the DC link voltage, the method comprising:
   determining an amplitude of a speed ripple of the drive shaft based at least in part on at least one of a torque, a horsepower, a frequency, or an acceleration of the drive shaft;
   determining a phase angle formed by the load resistance and a load capacitance of DC link capacitor;
   calculating a voltage signal value based on the amplitude of the speed ripple and the determined phase angle; and
   adjusting the DC link voltage according to the voltage signal value.

18. The method of claim 17 wherein a magnitude of the voltage signal value is proportional to the amplitude of the speed ripple and a phase of the DC link voltage adjustment is offset from the speed ripple by the phase angle.

19. The method of claim 17 further comprising measuring by the sensor an angular frequency of the speed ripple and wherein the phase angle is determined as an arctangent of one-half of a product of the angular frequency, the load capacitance, and the load resistance.

20. The method of claim 17 wherein the adjusting of the DC link voltage causes a damping power of the load resistance and the load capacitance to be in phase with a ripple power of the torsional oscillation.

* * * * *